United States Patent
Song

(10) Patent No.: US 6,786,431 B2
(45) Date of Patent: Sep. 7, 2004

(54) PORTABLE CONVERSION WASHING DEVICE FOR AUTOMOBILES

(76) Inventor: James In Song, 8281 San Marino Dr., Buena Park, CA (US) 90620

(*) Notice: Subject to any disclaimer, the term of this patent is extended or adjusted under 35 U.S.C. 154(b) by 0 days.

(21) Appl. No.: 10/356,112

(22) Filed: Feb. 3, 2003

(65) Prior Publication Data

US 2003/0111555 A1 Jun. 19, 2003

(51) Int. Cl.[7] .............................. B05B 7/02; B05B 9/01; B05B 15/06; B05B 3/00; B05B 3/18
(52) U.S. Cl. ........................ 239/526; 239/532; 239/754; 239/289; 239/578; 239/418
(58) Field of Search ................................. 239/526, 532, 239/754, 289, 578, 418, 407, 413, 525, 583, 518, 521, 523, 524, 433, 306, 314; 401/137, 138

(56) References Cited

U.S. PATENT DOCUMENTS

| | | | | |
|---|---|---|---|---|
| 2,584,630 A | * | 2/1952 | Soss ............................ 239/314 |
| 2,673,999 A | * | 4/1954 | Shey ............................ 401/136 |
| 2,742,323 A | * | 4/1956 | Shey ............................ 285/116 |
| 3,024,487 A | * | 3/1962 | Jones et al. ..................... 401/46 |
| 3,271,809 A | | 9/1966 | Morawski ..................... 401/42 |
| 3,806,261 A | * | 4/1974 | Soultanian ..................... 401/42 |
| 4,236,840 A | | 12/1980 | Kennedy ..................... 401/42 |
| 4,546,903 A | | 10/1985 | Burch .......................... 22/180 |
| 4,889,147 A | | 12/1989 | Chandler ..................... 134/123 |
| 4,895,468 A | | 1/1990 | Chappel ..................... 401/270 |
| 5,890,829 A | | 4/1999 | Hesse .......................... 401/179 |
| 6,095,709 A | | 8/2000 | Armer .......................... 401/268 |
| 6,250,833 B1 | | 6/2001 | Perry .......................... 401/278 |
| 6,279,839 B1 | * | 8/2001 | Chang .......................... 239/525 |
| 6,378,922 B1 | * | 4/2002 | Troudt .......................... 294/19.1 |
| 6,439,790 B1 | | 8/2002 | Kay .............................. 401/149 |

* cited by examiner

Primary Examiner—Michael Mar
Assistant Examiner—Darren Gorman
(74) Attorney, Agent, or Firm—Eugene Oak

(57) ABSTRACT

A novel portable conversion washing device for, including but not limited to, a car washing, building washing and boat washing is comprised of; 1) a brush head equipped with a soap water tank; 2) a water pipe with a water nozzle; 3) and a controlling handle for soap water and fresh water openings.

3 Claims, 5 Drawing Sheets

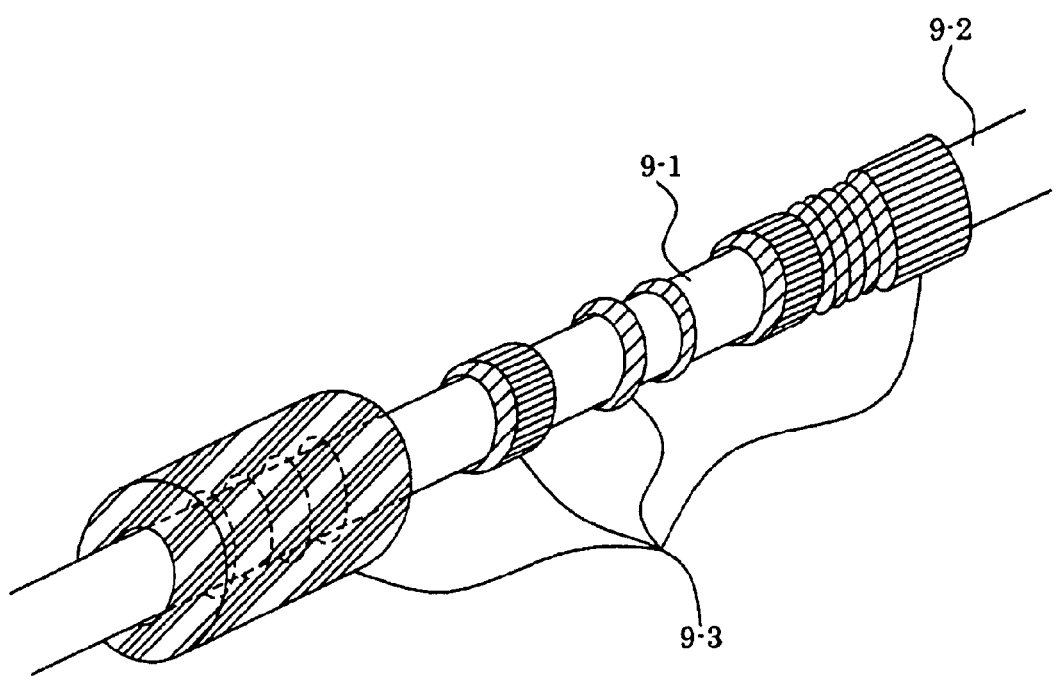
FIG.1-a

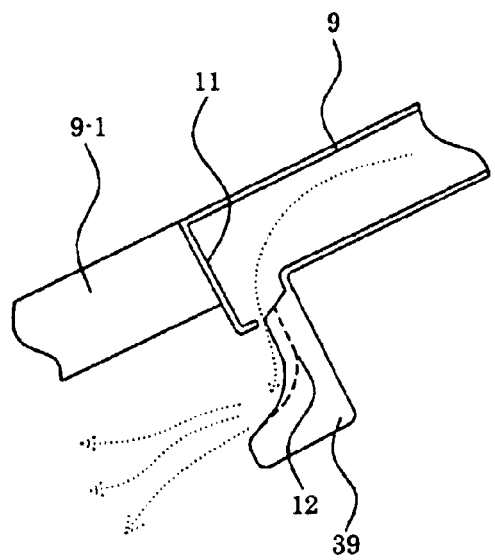
FIG.2
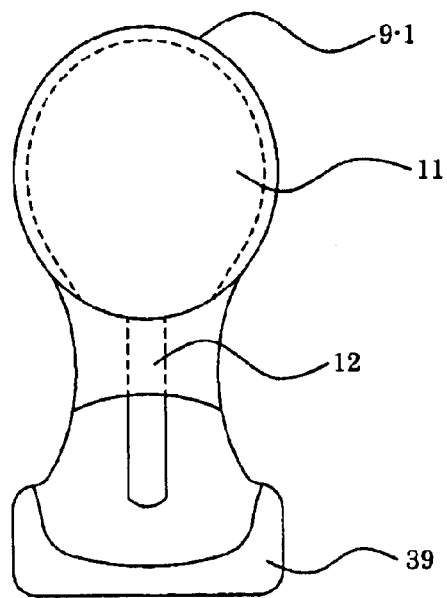
FIG.2-a

PORTABLE CONVERSION WASHING DEVICE FOR AUTOMOBILES

BACKGROUND OF THE INVENTION

Most of people use soap/soapy water, a brush and a water hose together to wash a car in their home. The first step is to spray the car surface with fresh water and then soak the car's outer surface with soapy water. After that scrub with brush and finally rinse the soapy water from the car's outer surface by spraying a fresh water. In these steps, the car washers have to change tools in each step and the chance of getting wet is very large. Though some of the prior art introduce multi-functional brushes doing soaping, scrubbing and flushing with one tool, those multi-functional brushes waste excess water in switching step from flushing to scrubbing step and then to a rinsing step to remove residual soapy water from the bristle of the brush head. It is the purpose of this invention to provide an efficient portable car-washing device easy to wash a car without changing the tools and save fresh water and soapy water both.

1. Field of the invention

The present invention relates to a portable washing device for automobiles. More particularly, this invention relates to a portable automobile washing device having shower spraying and washing fluid regulator.

2. Description of the Prior Art

If a brush head has a flat bottom and the soapy water tank has flat bottom structure, a flushing water should be lined inside of the brush head to sweep the residual soapy water in the soapy water tank. U.S. Pat. No. 2,584,630 to Soss illustrates such flat bottom brush head. However, it takes long time before the residual cleaning solution is swept out from the bristles (1) by the flushing water. U.S. Pat. No. 3,024,487 to Jones, et al. installs a separate cleaning solution line (36) and a spray orifice or slot (15) on the water pipe close to the one end of the brush. The water from the slot (15) is sprayed ahead of the brush to the opposite direction of the handle. However, the cleaning solution or soapy water, once sorbed to the bristles, does not easily rinsed out by the water from the slot (15). And because the water slot (15) is too close to the brush head and the water is sprayed to the direction of the brush head, it is hard to flush the surface of the cleaning subject with fresh water without touching the surface of the cleaning subject with the cleaning solution sorbed brush bristle. It is purpose of the current invention to provide a multi-purpose washing device, which minimizes waste water and soapy water by changing each step of car washing without sharing the soapy water line and fresh water line installed in one washing device.

U.S. Pat. No. 6,439,790 to Kay, U.S. Pat. No. 6,250,833 to Perry, et al. and U.S. Pat. No. 6,095,709 Armer, et al illustrate handle brushes having a housing that holds a supply of the liquid soap. A soap release assembly disposed in the head portion is movable between an open position and a closed position. U.S. Pat. No. 4,895,468 to Chappell, and U.S. Pat. No. 4,236,840 to Kennedy, and U.S. Pat. No. 3,271,809 to Morawski illustrate brushes having reservoirs for soap and a hose connected water supply. The water penetrate comes into the reservoir or spray through the brush head by the operation of a switch on the head of the brush. Their appearance is a kind of hand-scrubber connected to water supplier. U.S. Pat. No. 4,546,903 to Burch and U.S. Pat. No. 4,889,147 to Chandler illustrate portable car wash units utilizing compressed jet water supply. Their portable system is not a simple brush and accessories but a bulky system comprised of motor, pipes, etc.

The brush having similar appearance to this invention is U.S. Pat. No. 5,890,829 to Hesse, which illustrates a cleaning fluid reservoir handle scrub brush, which is formed by a bristle brush attached to one end of an elongated tube having a piston adjacent one-end portion forming a reservoir of fluid. However, the brush of '829 does not have direct connection to water.

None of the prior arts teaches a simple portable conversion car washer providing controlled water soap and spray water with one brush.

SUMMARY OF THE INVENTION

It is the purpose of this invention to provide a novel portable conversion washing device for, including but not limited to, a car washing, building washing and boat washing is comprised of; 1) a brush head equipped with a soap water tank; 2) a water pipe with a water nozzle; 3) and a controlling handle for soap water and fresh water openings. The brush head is composed of threads of brushes anchored to the lower surface of the plastic plate. A soap water tank is adhesively mounted on the upper surface of the plastic plate. A stopper pin, which penetrates the barrier on the brush head vertically, blocks the pinhole at bottom of the barrier. The head of the stopper pin is connected to a lever, which is pivotally attached on the upper surface of the barrier. The other end of the lever is connected to a trigger at the controlling handle via a wire. One end of a solid pipe is connected to the upper-back side of the brushing head and the other end is connected to a controlling handle. The length of the pipe is adjustable from 90 cm to 150 cm by utilizing two pipes of different diameter and a fastener. A nozzle for spraying water is located at the bottom side of the pipe 20 to 50 cm apart from the soap water tank. The controlling handle has an open connection to a conventional water hose. A trigger for soap is connected at the front side of the handle and another trigger for water is pivotally attached to the rear side of the handle. The washing device of this invention enables users an easy washing of a car, boat and other vehicles in their yard as well as easy cleaning of the outer surface of their houses.

BRIEF DESCRIPTION OF THE DRAWINGS

FIG. 1-*a* is an enlarged perspective view of the fastening connector for adjusting the total length of the front pipe and rear pipe.

FIG. 2 is an enlarged side view of the water nozzle.

FIG. 2-*a* is an enlarged perspective view of the pin wheel top at the bottom of the front pipe.

DETAILED DESCRIPTION OF THE PREFERRED EMBODIMENT

Figure 1:
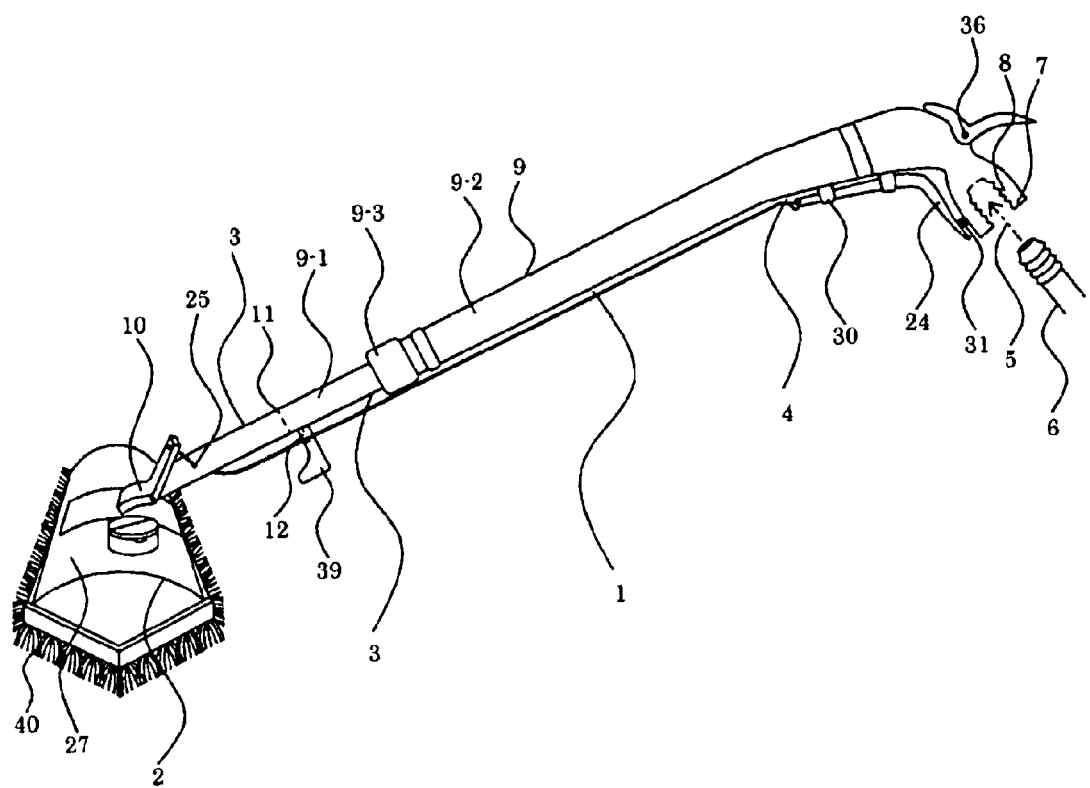
FIG. 1 is a perspective side view of the washer of this invention.

FIG. 1 is a perspective side view of the washer (1) of this invention. The washer (1) is comprised of brush head portion (2), water nozzle portion (3), and controller handle portion (4). Water (5) is supplied to the washer (1) through a hose (6) connected to the bottom (7) of the controller handle (8). The pipe (9) is comprised of two short pipes of, a front pipe (9-1), a rear pipe (9-2), having different diameters and lengths, and a fastening connector (9-3). Rear end of the rear pipe (9-2), which is made of, including but not limited to, aluminum, plastic and stainless steel, with 1.3 to 2.6 cm inner diameter and 50 to 180 cm length, is connected to the controller handle (8). Front end of the front pipe (9-1) is connected to the head of brush (10). FIG. 1-a is and enlarged perspective vieiw of the fastening connector for adjusting the total length of the front pipe and rear pipe. The length of the pipe (9) is adjusted by utilizing two pines (9-1) and (9-2) made of a same material and a fastening connector (9-3). FIG. 2 is an enlarged cross sectional side view of the front pipe (9-1) equipped with a water nozzle (12) and a water reflector tip (39). The front pipe (9-1) is blocked by a plate (11) just behind the water nozzle (12). Therefore, the water, comes out of the front pine (9-1) through the nozzle (12) and bounces again by the reflector tip (39), is sprayed to the brush head (10) direction. FIGS. 2-1 is an enlarged front view of the water nozzle (12). The water nozzle (12) is developed about 20 to 30 cm apart from the brush head (10). An instant switching to a soaping step from a fresh water spraying step and an immediate switching to the rinsing step from the soaping and brushing step is possible without contamination by the soapy water dripping from the bristles (40) of the brush head because of the distance between the brush head (10) and water spray nozzle (12). The front pipe (9-1) is blocked by a member (11) inside of the pipe (9).

Figure 3:
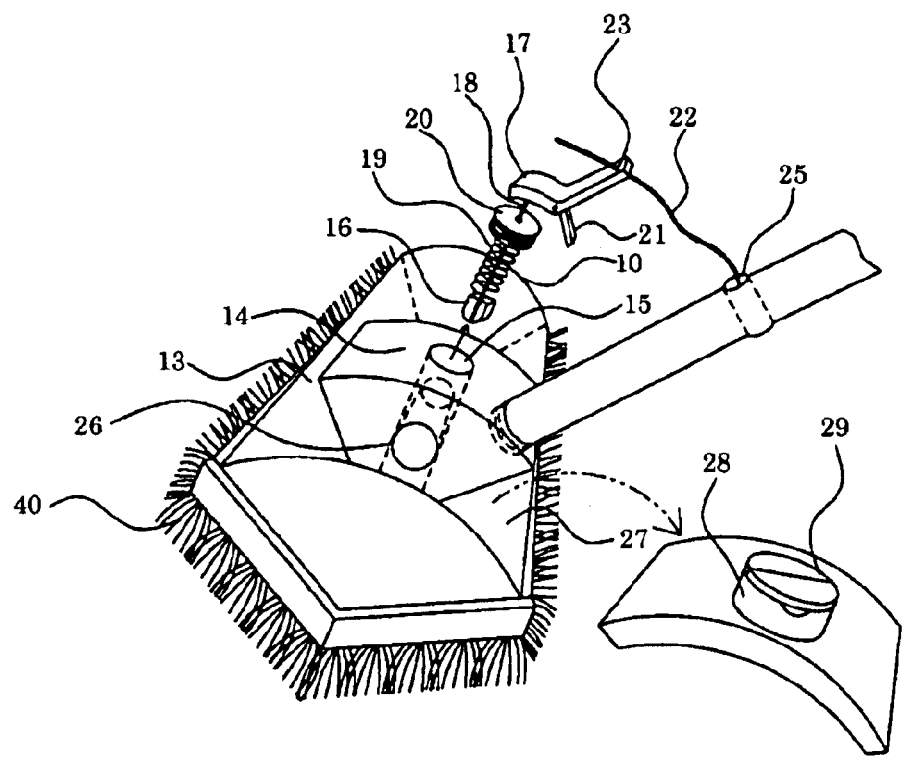
FIG. 3 is an expanded part drawing of the brush head of this invention.
Figure 4:
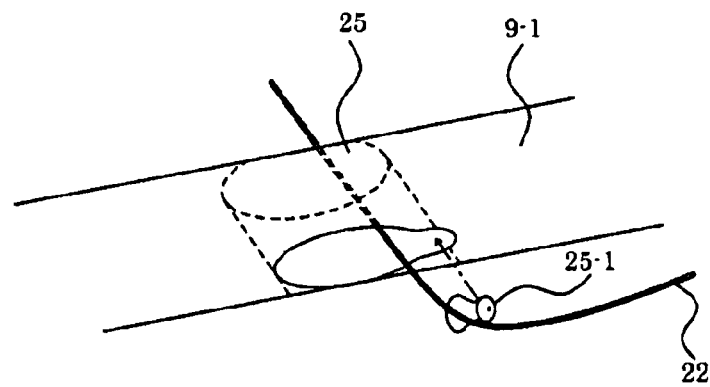
FIG. 4 is an enlarged perspective view of the pinwheel top at the bottom of the front pipe.
Figure 5:
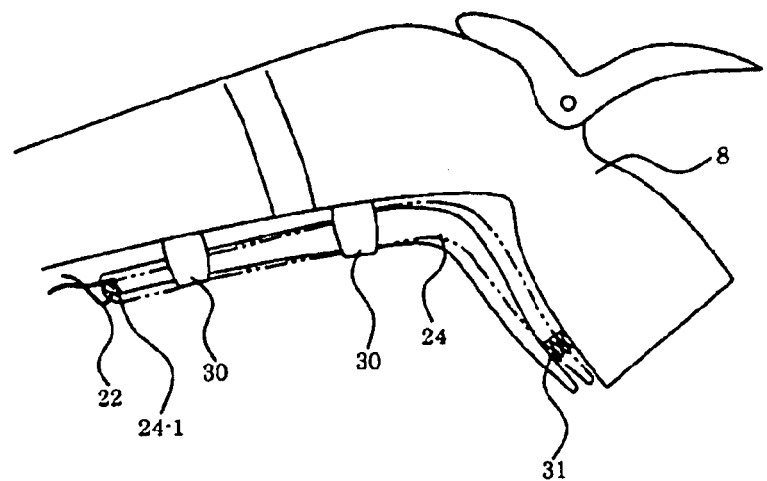
FIG. 5 is an enlarged side view of the controller handle.

FIG. 3 is an expanded cart drawing of the brush head (10) of this invention. The brush head (10) is a plastic mold of "V" shape plate (13) having a barrier of thickness 3 to 5 cm (14) at the center of the upper surface. The "V" shape of the brush head (10) facilitates the soapy water in tank (27) to flow into a stopper hole (15) at the bottom. The bristles (40), planted to the brush head (10) along the outer surface of "V" shape, forms another smooth "V" shape bristle surface and make it possible to approach to curved surfaces of a car more easily and results in more efficient cleaning. A stopper hole (15) is developed through the barrier from the top to the bottom. A stopper (16) is connected to a lever (17) by a metal wire (18). A spring (19) is engaged between the stopper (16) and a screwed cap (20), through which the metal wire (18) penetrate. The lever (17) is pivotally fixed on the barrier (14) by a fixing member (21). A metal wire (22) is connected to the lever (17) at the rear end (23) thereof. The other end of the wire (22) is connected to a trigger (24) after pass through a hole (25) on the pipe (9-1). The hole (25) is developed with an angle of 30 degree to the vertical of the pipe (9-1). FIG. 2-a is an enlarged perspective view of the small wheel at the bottom of the front pipe. One small wheel (25-1) is installed inside of the lower rear wall of the hole (25) for receiving the wire (22) and for smooth operation. Another hole (26) is developed throughout the barrier (14) to penetrate the stopper hole (15), for the soapy water to enter. A soapy water tank (27), made of a transparent plastic is mounted on the brush head (13) and glued thereon. Soapy water is introduced to the tank (27) through the opening (28). The opening (28) is blocked with a cap (29). FIG. 5 is an enlarged side view of the controller handle portion (4).

Figure 6:
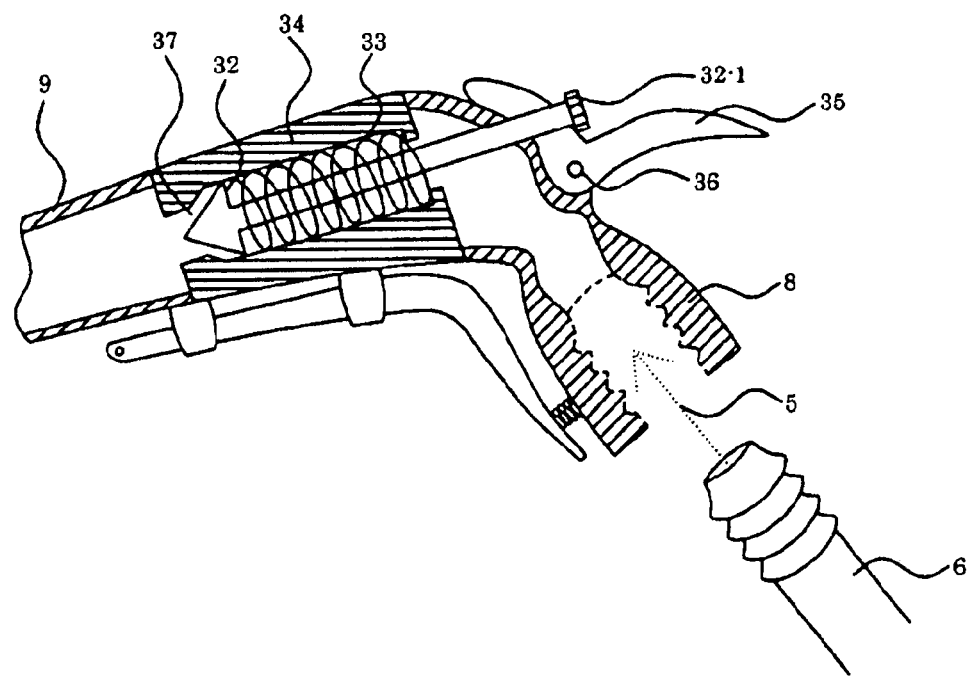
FIG. 6 is a cross sectional view of the controller handle of this invention.

A trigger (24), tied to the wire (22), is hanged to the controller handle (8) by two supports (30). A spring (31), engaged between the trigger (24) and the handle, (8) renders a repulsion force to release the trigger (24). A small hole (24-1) is developed at the front site of the trigger to adjust the length of the wire (22) following the length of the pipe, which is adjusted by the front pipe (9-1), rear pipe (9-2) and the fastening joint (9-3) as shown in FIG. 1-1. When a user pulls back the trigger (24), the wire (22) pulls down the rear end of the lever (23). Then the other side of the lever (17) is pulled up and then the stopper (16) is pulled up ward to open the bottom of the hole (15). The soapy water comes into the hole (26) and goes down to the bottom of the hole (15) and wets the brush bristles (40). When a user release the trigger (24), repulsion forces rendered by the spring (31) on the trigger (24) and the other spring (19) between the stopper (16) and the screwed cap (20) pushes the stopper (16) back into the bottom of the hole (15) and blocks the soapy water in the tank (27). FIG. 6 is a cross sectional view of the controller handle (8) of this invention.

A water hose (6) is connected to the bottom (7) of the handle (8). A trigger pin (32) and a spring (33) in a case (34) are installed inside the handle. The rear end (32-1) of the trigger pin (32) is connected to a lever (35), which is pivotally installed at the outer rear side of the handle (8) by a pivot pin (36). When a user pulls down the lever (35), the trigger pin (32) is pulled backward and then an opening (37) is developed. The water passes through the opening (37) and comes into the pipe (9). When a user releases the lever (35), the spring (33) pushes the trigger (32) back into the opening (37) to cut the water flow. FIG. 2 is an enlarged side view of the water nozzle (12) and FIG. 2-1 is an enlarged front view of the water nozzle (12). The water nozzle (12) is developed about 20 to 30 cm apart from the brush head (10). The front pipe (9-1) is blocked by a member (11) inside of the pipe (9). When a user pushes down the water lever (35), the water comes into the pipe and flushes out through this nozzle (12) bounced by the member (11). The water comes out of the nozzle (12) bounces again by the reflector tip (39) and is sprayed to the brush head (10) direction.

The distance from the brush head (2) to water spray nozzle (12) enables fresh water spraying to the cleaning surface without touching the surface with soapy water sorbed brush head bristle (40). As a result, less amount of fresh water is consumed.

The washer of this invention enables a user; 1) to control the flow of soap water and the water with one hand; and 2) to wash a car, boat and building easily without using mop, water bucket and soap.

What is claimed is:

1. A portable conversion washing device comprising:

a) a brush head including a V-shaped plastic plate, a liquid soap tank formed within the plastic plate, a plurality of bristles anchored to a lower surface of the plastic plate, a barrier formed within a central portion of the plastic plate, a first lever pivotally mounted on an upper surface of the barrier, and a stopper pin slidably received within a passageway formed in the barrier for blocking an outlet opening in the barrier, the stopper pin being connected to one end of the first lever;

b) an adjustable length water pipe including first and second telescoping pipes of different diameter, the first pipe having a forward end connected to an upper surface of the barrier, and a water spraying nozzle extending from a bottom surface thereof and spaced 20 cm apart from the brush head for directing water spray towards the brush head, the second pipe having a connector at a rearward end for attachment to a water hose; and c) a control handle formed on a rearward end portion of the second pipe which includes a trigger mounted on a front side of the control handle and operatively connected to the other end of the first lever to selectively release the liquid soap from the liquid soap tank to the bristles, and a water control system mounted on a rearward side of the control handle which includes a second lever, a trigger pin, and a spring, for controlling the flow of water from the water hose to the water pipe.

2. The washing device of claim 1, wherein the other end of the first lever is connected to the trigger at the control handle via a length of adjustable metal wire.

3. The washing device of claim 1, wherein the adjustable length water pipe is adjustable from 90 cm to 180 cm.

* * * * *